United States Patent
Xing et al.

(10) Patent No.: US 12,024,575 B2
(45) Date of Patent: Jul. 2, 2024

(54) CO-CURED FLUOROELASTOMERS WITH IMPROVED CHEMICAL RESISTANCE

(71) Applicants: CNPC USA CORPORATION, Houston, TX (US); Beijing Huamei Inc., Beijing (CN)

(72) Inventors: Peixiang Xing, Houston, TX (US); Jiaxiang Ren, Houston, TX (US); Peng Cheng, Sugard Land, TX (US); Yu Liu, Beijing (CN); Yonghong Wang, Beijing (CN)

(73) Assignees: CNPC USA CORPORATION, Houston, TX (US); Beijing Huamel Inc., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 0 days.

(21) Appl. No.: 18/054,881

(22) Filed: Nov. 11, 2022

(65) Prior Publication Data
US 2023/0105164 A1    Apr. 6, 2023

Related U.S. Application Data

(62) Division of application No. 16/795,417, filed on Feb. 19, 2020, now Pat. No. 11,566,090.

(51) Int. Cl.
| C08F 214/00 | (2006.01) |
| C08F 214/26 | (2006.01) |
| C08F 214/28 | (2006.01) |
| C08K 5/14 | (2006.01) |
| C08K 5/3492 | (2006.01) |

(52) U.S. Cl.
CPC ...... C08F 214/267 (2013.01); C08F 214/282 (2013.01); C08K 5/14 (2013.01); C08K 5/3492 (2013.01)

(58) Field of Classification Search
CPC .......... C08L 27/16; C08L 27/18; C08L 23/147
See application file for complete search history.

(56) References Cited

U.S. PATENT DOCUMENTS

| 6,503,986 B1* | 1/2003 | Tanaka | C09K 3/1009 525/200 |
| 2010/0069558 A1* | 3/2010 | Stanga | C08G 65/007 524/495 |
| 2010/0239867 A1* | 9/2010 | Tsuchiya | C09K 3/1009 427/430.1 |

FOREIGN PATENT DOCUMENTS

JP    2017-008166    *    1/2017

OTHER PUBLICATIONS

Translation of JP 2017-008166 (Year: 2017).*
Translation of Table 5 of JP 2017-008166 (Year: 2017).*

* cited by examiner

*Primary Examiner* — Robert C Boyle
(74) *Attorney, Agent, or Firm* — Frank Gao, Esq.

(57) ABSTRACT

Co-cured blends of fluoroelastomers of tetrafluoroethylene-propylene copolymer with cure site monomer and terpolymers of Vinylidene fluoride (VDF), Hexafluoropropylene (HFP) and Tetrafluoroethylene (TFE) with peroxide as initiator and coagent TAIC as crosslinker show improved curing performance, improved mechanical properties and improved compression set as well. The co-cured fluoroelastomers show improved chemical resistance to the solvent aging systems and better retention of mechanical properties after aging at high temperature in the solvents system.

14 Claims, 9 Drawing Sheets

CO-CURED FLUOROELASTOMERS WITH IMPROVED CHEMICAL RESISTANCE

CROSS-REFERENCE TO RELATED APPLICATIONS

This application is a divisional of U.S. patent application Ser. No. 16/795,417 filed on Feb. 19, 2020. The disclosure of the above application is incorporated herein by reference.

FIELD

The disclosure relates generally to elastomers. The disclosure relates specifically to co-cured fluoroelastomers.

BACKGROUND

Copolymers of tetrafluoroethylene (TFE) and propylene (PP) (FEPM) are known to exhibit excellent resistance to nucleophilic attack (such as primary and secondary amines), but exhibit relatively poor resistance to many hydrocarbons, especially aromatic hydrocarbons. These copolymers are also known for relatively poor processing ability and molding ability.

It would be advantageous to develop novel fluoroelastomers with improved chemical resistance and compression set.

SUMMARY

An embodiment of the disclosure is a co-cured elastomeric blend comprising a fluoropolymer A and a fluoropolymer B. In an embodiment, fluoropolymer A comprises monomer units of tetrafluoroethylene (TFE), propylene (PP), and cure site monomers (CSM). In an embodiment, fluoropolymer B comprises monomer units of vinylidene fluoride (VDF) hexafluoropropylene (HFP), and tetrafluoroethylene (TFE). In an embodiment, fluoropolymer A and fluoropolymer B are crosslinked with a peroxide initiator and a triazine cross linker. In an embodiment, the propylene of fluoropolymer A can range between 35-55%. In an embodiment, the blend may contain 25-100 pph (parts per hundred parts rubber or polymers) polymer A. In an embodiment, the blend may contain 25-100 pph fluoropolymer B. In an embodiment, the peroxide crosslinking initiator is 2,5-dimethyl-2,5-di(t-butylperoxy)hexane (DBPH). In an embodiment, the DBPH is present in 3 parts per 100 parts of polymer blend, and may range from 1 part to 7 parts. In an embodiment an alternative peroxide initiator may be di(t-butylperoxyisopropyl)benzene. In an embodiment, the triazine co-crosslinking agent is triallyl isocyanurade (TAIC). In an embodiment, the TAIC is present in 5 parts per 100 parts of polymer blend, and may range from 1 part to 7 parts. In an embodiment, carbon black is used as a hardening agent for the polymer blend. In an embodiment, carbon black is present in a range of 0 to 60 parts per 100 parts of polymer blend, targeting a desired Shore hardness (Duro). In an embodiment, the cure site monomers may be bromine, iodine, or a combination thereof. In an embodiment, the co-cured fluoroelastomers have improved curing performance and molding ability. In an embodiment, the curing time was reduced. In an embodiment, the fluoroelastomeric blend has improved mechanical properties including but not limited to: tensile strength, modulus at 50% elongation, modulus at 100% elongation, and tear strength. In an embodiment, the blend exhibits a synergistic effect and improvement in compression set, having reduced compression set from 37% of fluoropolymer A to 24% in the blend. In an embodiment the blend has two glass transition temperatures ($T_g$) which correspond to the single fluoropolymers A and B; indicative of phase separation and two-phase structure. In an embodiment, the swelling percentage demonstrated less swelling percentage compared with the calculated average after the solvent aging test at 200° C. for 168 hours in autoclaves. In an embodiment, the blend exhibited less hardness reduction compared to single fluoropolymer A. In an embodiment, the blend exhibited higher retention of tensile strength compared to single fluoropolymers A or B. In an embodiment, the blend exhibited a higher retention of tear strength compared with single fluoropolymers A or B.

In an embodiment, fluoropolymer A is co-cured with a fluoropolymer C to form a co-cured fluoroelastomeric blend, Fluoropolymer A comprises monomer units of tetrafluoroethylene (TFE), propylene (PP), and cure site monomers (CSM). Fluoropolymer C comprises monomer units of VDF, TFE, and a fluorinated vinyl ether (PMVE). Fluoropolymer A and fluoropolymer C are crosslinked with a peroxide initiator and a triazine cross linker. In an embodiment, the propylene of fluoropolymer A can range between 35-55%. In an embodiment, the blend may contain 25-100 pph fluoropolymer A, In an embodiment, the blend may contain 25-100 pph fluoropolymer C. In an embodiment, the peroxide crosslinking initiator is 2,5-dimethyl-2,5-di(t-butylperoxy)hexane (DBPH). In an embodiment, the DBPH is present in 3 parts per 100 parts of polymer blend. In an embodiment the triazine crosslinker is triallyl isocyanurade (TAIC). In an embodiment, the TAIC is present in 5 parts per 100 parts of polymer blend. In an embodiment, carbon black is used as a hardening agent for the polymer blend. In an embodiment carbon black is present at a range of 0 to 60 parts per 100 parts of polymer blend, targeting a desired Shore hardness (Duro). In an embodiment, the cure site monomers may be bromine, iodine, or a combination thereof. In an embodiment, the co-cured fluoroelastomers have improved curing performance and molding ability. In an embodiment, the curing time was reduced.

Further in another embodiment, a co-cured elastomeric blend comprising a fluoropolymer A and a fluoropolymer C. The fluoropolymer A may comprise monomer units of tetrafluoroethylene (TFE), propylene (PP), and cure site monomer (CSM). The fluoropolymer C comprises at least one monomer unit of a perfluorinated vinyl ether (PMVE); and the fluoropolymer A and fluoropolymer C are crosslinked with a peroxide initiator, and a triazine co-crosslinking agent.

In additional embodiment, a co-cured elastomeric blend comprising a fluoropolymer A and a fluoropolymer C. The fluoropolymer A comprises monomer units and cure site monomer (CSM). The fluoropolymer C comprises at least one monomer unit of a perfluorinated vinyl ether (PMVE); and fluoropolymer A and fluoropolymer C are crosslinked with a peroxide initiator, and a triazine co-crosslinking agent.

Optionally in any embodiment, fluoropolymer A is present in about 25-75 parts per 100 parts of blend.

Optionally in any embodiment, fluoropolymer C is present in about 25-75 parts per 100 parts of polymers blend, more specifically, about 25-65 parts per 100 parts of polymers blend.

Optionally in any embodiment, the CSM is selected from the group consisting of iodine atom and bromine atom.

Optionally in any embodiment, the peroxide initiator comprises di(t-butylperoxyisopropyl)benzene and di(t- butylperoxyisopropyl)benzene is present at about 1 to 5 parts per 100 parts of polymers blend.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
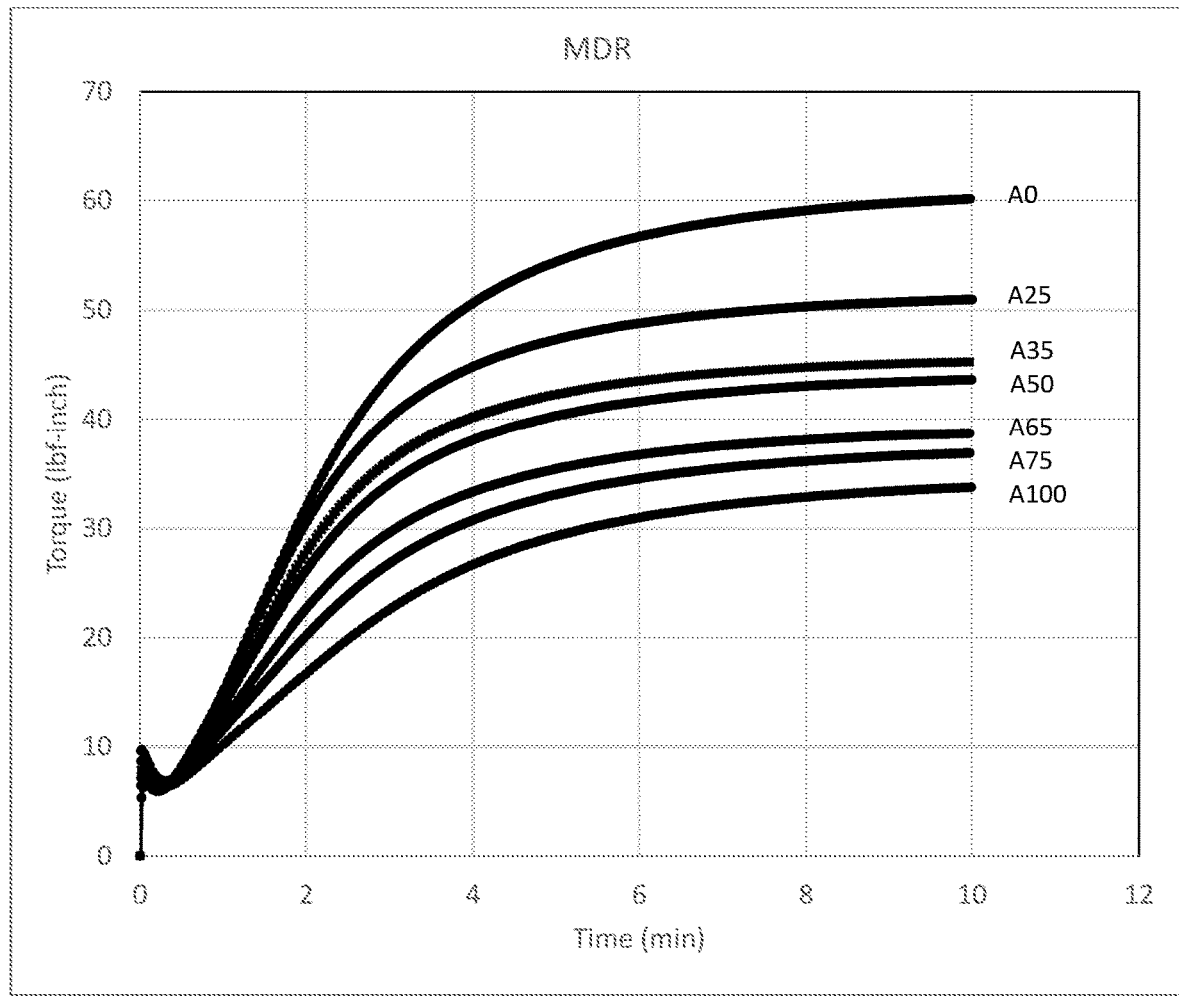
FIG. 1. depicts MDR curing curves of the co-cured fluoroelastomers from fluoropolymer A and B.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3$^{rd}$ Edition.

It would be advantageous to develop new fluoroelastomers by incorporating FKM type fluoroelastomer Type II or Type III with FEPM to make new fluoroelastomers through the design of microstructure and phase structure.

Fluoropolymer A is a grade of the fluoroelastomer FEPM, a copolymer of tetrafluoroethylene (TFE) and propylene (PP) with cure-site monomers (CSM). This is different from conventional FEPM, which doesn't have CSM. In an embodiment, this polymer can be found as Aflas 600X from Asahi Glass Corporation.

Fluoropolymer B is a type II FKM per ASTM D1418. Polymer B is a terpolymer with Vinylidene fluoride (VDF), Hexafluoropropylene (HFP) and Tetrafluoroethylene (TFE). In an embodiment, this polymer is Tecnoflon P959.

Fluoropolymer C is a type III FKM per ASTM D1418. Polymer C is a terpolymer with Vinylidene fluoride (VDF), Tetrafluoroethylene (TFE), and a fluorinated vinyl ether (PMVE). In an embodiment, this polymer is Tecnoflon PL958.

Triallyl isocyanurade (TAIC) is a triazine crosslinker for the elastomers to form rubber. In an embodiment, Vulcofac TAIC-72 DLC is commercial grade and have 72% assay.

2,5-dimethyl-2,5-di(t-butylperoxy)hexane (DBPH) is a peroxide initiator for the crosslinking. In an embodiment, Varox DBPH-50 HP is commercial grade and has 45% assay on an inert carrier.

Carbon black N326 is commercial grade and helps the elastomer to have better mechanical properties due to its small size and length/radius ratio.

In an embodiment, compounding of the fluoroelastomer formulations was performed using a two-roll mill at room temperature for 30 minutes to achieve mixing of all components and additives. In an embodiment, all compounding components and ingredients were pre-blended before introduction to the mill.

The mixed compound was press-cured at 177° C. for 10 minutes, post-cured for 4 hours at 200° C., and post cured for 16 hours at 204° C. Standard compression molding was employed to prepare the test specimens. In an embodiment, the test specimens included molded slabs and buttons.

TABLE 1

Fluoropolymer A, fluoropolymer B, and fluoropolymer C.

| Polymers | Composition, special gravity |
|---|---|
| Fluoropolymer A | copolymer of tetrafluoroethylene (TFE) and propylene (PP) <br> Special gravity: 1.597 <br> Fluorine content 57% wt |
| Fluoropolymer B | terolymer of vinylidene fluoride (VDF), hexafluropropylene (HFP) and tetrafluoroethylene (TFE) <br> Special gravity: 1.822 <br> Fluorine content 70% wt |
| Fluoropolymer C | terolymer of vinylidene fluoride (VDF), tetrafluoroethylene (TFE) and a fluorinated vinyl ether (PMVE) <br> Special gravity: 1.83 <br> Fluorine content 66% wt |

In an embodiment, formulations contained 45 pphr N326 carbon black and had around 90 durometer hardness. Various compound recipes are provided in Table 2A and Table 2B.

TABLE 2A

Exemplary formulations of the co-cured fluoroelastomers from fluoropolymers A and B

| Compound | A100 | A75 | A65 | A50 | A35 | A25 | A0 |
|---|---|---|---|---|---|---|---|
| Fluoroelastomer A* | 100 | 75 | 65 | 50 | 35 | 25 | — |
| Fluoroelastomer B* | — | 25 | 35 | 50 | 65 | 75 | 100 |
| N326 Black | 45 | 45 | 45 | 45 | 45 | 45 | 45 |
| Sodium Stearate | 1 | 1 | 1 | 1 | 1 | 1 | 1 |
| Vulcofac TAIC-72 DLC | 5 | 5 | 5 | 5 | 5 | 5 | 5 |
| Varox DBPH-50 | 3 | 3 | 3 | 3 | 3 | 3 | 3 |
| Total pphr | 154 | 154 | 154 | 154 | 154 | 154 | 154 |

TABLE 2B

Exemplary formulations of the co-cured fluoroelastomers from fluoropolymer A and C.

| Compound | A100 | AC75 | AC50 | AC25 | C |
|---|---|---|---|---|---|
| Fluoroelastomer A* | 100 | 75 | 50 | 25 | — |
| Fluoroelastomer C* | — | 25 | 50 | 75 | 100 |
| N326 Black | 45 | 45 | 45 | 45 | 45 |
| Sodium Stearate | 1 | 1 | 1 | 1 | 1 |
| Vulcofac TAIC-72 DLC | 5 | 5 | 5 | 5 | 5 |
| Varox DBPH-50 | 3 | 3 | 3 | 3 | 3 |
| Total pphr | 154 | 154 | 154 | 154 | 154 |

Test specimens for all physical properties and solvent aging tests were die-cut from the molded slabs per ASTM.

EXAMPLES

Example 1

Rheology and Curing Test

The curing response tests with large deformations were conducted on the oscillating disc rheometer (ODR).

The curing response tests with small deformations were conducted on the moving die rheometer (MDR). The tests were run on uncured, compounded samples using an Alpha Technologies MDR model 2000 according to ASTM D 5289-3a at 177° C., without preheating, 12 minutes elapsed time, and a 0.5 degree arc, Both the minimum torque (ML) and highest torque (MH) were recorded.

Curing Performance:

The new grade of FEPM with cure-site monomers has a faster curing time compared to traditional FEPM without cure-site monomers. The close curing time for both A100 (FEPM) (fluoropolymer A) and A0 (FKM) (fluoropolymer B) is preferred. By comparing the curing time (Tc90 from ODR measurement, and Tc90 from MDR measurement), both A100 (FEPM) and A0 (FKM) have very similar curing times, From ODR, 7.83 min (Tc90) is for A100 (FEPM) and 6.09 min (Tc90) is for A0 (FKM). From MDR, 6.03 min (Tc90) is for A100 (FEPM) and 5.11 min (Tc90) is for A0 (FKM). The curing times indicate that the co-curing system including both component should have matched curing time. The test results of Tc90 from ODR and MDR for A75, A65, A50, A35, and A25 clearly support this hypothesis. Also, from Table 3 and FIG. 1, the higher torque and faster cure rate indicates a more efficient cure response of A75, A65, A50, A35, and A25 with incorporating fluoropolymer B comparing with pure fluoropolymer A (A100).

From Tables 3A (co-cured fluoroelastomers from fluoropolymers A and B) and Table 3B (co-cured fluoroelastomers from fluoropolymers A and C), all compounds exhibit good scorch times (~0.5 min and above), which will allow the enough time for the operation of compression molding and other molding.

Both ODR and MDR test data indicate that the compounded fluoroelastomers have good process ability, extrusion and molding ability.

The value of MH-ML for the same series of fluoroelastomer is an indicator of the crosslinking density change. The larger value, the higher crosslinking density. In this study, the value of MH-ML of co-cured fluoroelastomers increases with adding the fluoropolymer B (Table 3A). Even though the chemical composition of the compounded fluoroelastomer is not the same, but we still can consider approximately that the crosslinking density increases. FIG. 1 shows the MDR curing curves of co-cured fluoroelastomers from fluoropolymers A and B, which clearly indicates that with adding the fluoropolymer B, the MH (high modulus) from the curing curves of the compounded fluoroelastomer increases.

TABLE 3A

Rheology properties of the co-cured fluoroelastomers from fluoropolymers A and B.

| Compound | A100 | A75 | A65 | A50 | A35 | A25 | A0 |
|---|---|---|---|---|---|---|---|
| Mooney Scorch, 121° C., Lg, 1 + 30 | | | | | | | |
| Min Visc., MU | 141.0 | 128.8 | 130.2 | 121.5 | 120.2 | 119.7 | 111.8 |
| 30' Visc., MU | 147.6 | — | — | — | — | — | — |
| 30' Visc. Rise, MU | 6.62 | — | — | — | — | — | — |
| Scorch, Ts5, min | 24.2 | 18 | 16.08 | 17.7 | 16.7 | 17.5 | 14.9 |
| ODR 177° C., 3° arc, 12 min test | | | | | | | |
| MI, in-lbf | 54.62 | 46.38 | 46.4 | 42.50 | 41.73 | 41.41 | 38.11 |
| ML, in-lbf | 28.21 | 26.65 | 28.16 | 25.19 | 25.12 | 23.96 | 20.48 |
| MH, in-lbf | 132.56 | 146.68 | 154.65 | 161.31 | 173.65 | 177.08 | 182.85 |
| Ts2, min | 1.49 | 1.18 | 1.18 | 1.14 | 1.05 | 1.08 | 0.98 |
| Tc50, min | 4.22 | 3.69 | 3.55 | 3.29 | 3.2 | 3.21 | 3.33 |
| Tc90, min | 7.83 | 7.19 | 6.78 | 6.20 | 5.89 | 5.69 | 6.09 |
| MDR 177° C., 0.5° arc, 10 min test | | | | | | | |
| MI, in-lbf | 9.00 | 7.51 | 7.69 | 7.68 | 7.04 | 7.81 | 7.79 |
| ML, in-lbf | 6.39 | 6.58 | 6.39 | 6.50 | 6.05 | 6.42 | 5.94 |
| MH, in-lbf | 33.75 | 38.27 | 38.71 | 43.63 | 45.56 | 50.96 | 60.16 |
| Ts2, min | 0.73 | 0.64 | 0.6 | 0.56 | 0.52 | 0.52 | 0.48 |

TABLE 3A-continued

Rheology properties of the co-cured fluoroelastomers from fluoropolymers A and B.

| Compound | A100 | A75 | A65 | A50 | A35 | A25 | A0 |
|---|---|---|---|---|---|---|---|
| Tc50, min | 2.54 | 2.30 | 1.98 | 1.90 | 1.74 | 1.87 | 2.07 |
| Tc90, min | 6.03 | 5.56 | 4.91 | 4.78 | 4.25 | 4.61 | 5.11 |

TABLE 3B

Rheology properties of the co-cured fluoroelastomers from fluoropolymers A and C.

| Compound | A100 | AC75 | AC50 | AC25 | C |
|---|---|---|---|---|---|
| Mooney Scorch, 121° C., Lg, 1 + 30 | | | | | |
| Min Visc., MU | 141.0 | 139.2 | 129.9 | 133.5 | 131.1 |
| 30′ Visc., MU | 147.6 | 147.3 | 139.8 | | |
| 30′ Visc. Rise, MU | 6.62 | 8.1 | 10.0 | | |
| Scorch, Ts5, min | 24.2 | 22 | 19.7 | 19.6 | 14.7 |
| ODR 177° C., 3° arc, 12 min test | | | | | |
| MI, in-lbf | 54.62 | 44.07 | 50.49 | 41.76 | 37.71 |
| ML, in-lbf | 28.21 | 25.97 | 28.11 | 27.86 | 23.75 |
| MH, in-lbf | 132.56 | 137.32 | 162.23 | 169.33 | 154.99 |
| Ts2, min | 1.49 | 1.18 | 1.31 | 1.11 | 1.04 |
| Tc50, min | 4.22 | 3.62 | 3.57 | 3.36 | 3.51 |
| Tc90, min | 7.83 | 7.14 | 6.44 | 6.01 | 6.39 |
| MDR 177° C., 0.5° arc, 10 min test | | | | | |
| MI, in-lbf | 9.00 | 8.81 | 9.18 | 9.38 | 8.18 |
| ML, in-lbf | 6.39 | 6.57 | 6.71 | 7.26 | 6.64 |
| MH, in-lbf | 33.75 | 36.97 | 43.74 | 52.33 | 56.41 |
| Ts2, min | 0.73 | 0.69 | 0.59 | 0.55 | 0.52 |
| Tc50, min | 2.54 | 2.25 | 1.98 | 1.98 | 2.06 |
| Tc90, min | 6.03 | 5.43 | 4.79 | 4.69 | 4.98 |

Example 2

Physical Properties

Hardness: samples were measured according to ASTM D2240-85.

Compression set: was measured according to ASTM 395-89 on the buttons at 200° C. for 70 hours.

Tensile test: Tensile properties were determined according to ASTM D412 on the Die-cut specimens of post-cured samples slabs (ASTM D412 Die C).

Tear test: Tear strength were determined by using ASTM D 624 on specimens cut from ASTM 624 Die C.

Glass transition temperature (Tg) were tested on the TA instrument DSC Q20, using 10° C./min with N2 gas flow from −80° C. to 250° C.

Thermal degradation were tested on the TA instrument TGA Q50, using scan rate 10° C./min with N2 gas to 700° C., then switched to air to 900° C.

Tables 4A (co-cured fluoroelastomers from fluoropolymers A and B) and 4B (co-cured fluoroelastomers from fluoropolymers A and C) show the physical properties of compounded co-cured fluoroelastomers in the press-cured (compression mold cured for 10 min at 177° C., and post-cured for 16 hours at 204° C. The samples also have shore A hardness from 85 to 90 duro A. The test data of press-cured samples clearly show good tensile strength, elongation and tear strength. The good tensile properties and tear strength are good indicator for the good molding ability (not damage during demolding).

After post-curing for 16 hours at 204° C., the Shore A hardness increased 4 to 5 from the press-cured samples, and range from 90 to 94 duro A.

The tear strength increases with the addition of fluoropolymer B from 155 pli of A100 to 185 pli of A35. Comparing with A100, the tensile strength slight increases with A65, A50, A35, and A25. Both modus at 50% and the modulus at 100% increases with adding fluoroelastomer B (A75, A65, A50, A35, A25) (Table 4A).

TABLE 4A

Physical properties of press-cured and post cured co-cured fluoroelastomers from fluoropolymers A and B

| Compound | A100 | A75 | A65 | A50 | A35 | A25 | A0 |
|---|---|---|---|---|---|---|---|
| Physical Properties, Post Cure 16 hour @ 204° C. | | | | | | | |
| Hardness, Duro A | 91 | 90 | 90 | 93 | 92 | 94 | 9 |
| Specific Gravity | 1.623 | 1.678 | 1.701 | 1.734 | 1.77 | 1.791 | 1.852 |
| Tensile Strength, psi | 3293 | 3084 | 3321 | 3348 | 3301 | 3471 | 3397 |
| Elongation, % | 124 | 108 | 114 | 104 | 114 | 107 | 98 |
| 50% Modulus, psi | 1334 | 1417 | 1436 | 1639 | 1466 | 1664 | 1729 |
| 100% Modulus, psi | 2813 | 2829 | 2982 | 3302 | 2890 | 3238 | — |
| Tear Die C, pli | 155 | 160 | 178 | 177 | 185 | 181 | 182 |
| Physical Properties, Molded 10 min @ 177° C., Press Cured, No post cure | | | | | | | |
| Hardness, Duro A | 87 | 86 | 85 | 89 | 87 | 90 | 88 |
| Specific Gravity | 1.614 | 1.662 | 1.685 | 1.719 | 1.754 | 1.779 | 1.833 |

TABLE 4A-continued

Physical properties of press-cured and post cured co-cured fluoroelastomers from fluoropolymers A and B

| Compound | A100 | A75 | A65 | A50 | A35 | A25 | A0 |
|---|---|---|---|---|---|---|---|
| Tensile Strength, psi | 3028 | 3024 | 2894 | 2934 | 3152 | 3050 | 3298 |
| Elongation, % | 156 | 140 | 129 | 130 | 140 | 127 | 121 |
| 50% Modulus, psi | 586 | 715 | 786 | 781 | 825 | 831 | 1028 |
| 100% Modulus, psi | 1611 | 1992 | 2070 | 2244 | 2273 | 2348 | 2607 |
| Tear Die C, pli | 113 | 113 | 129 | 131 | 132 | 133 | 120 |

TABLE 4B

Physical properties of press-cured and post cured co-cured fluoroelastomers from fluoropolymers A and C

| Compound | A100 | AC75 | AC50 | AC25 | C |
|---|---|---|---|---|---|
| Physical Properties, Post Cure 16 hour @ 204° C. | | | | | |
| Hardness, Duro A | 91 | 90 | 93 | 93 | 90 |
| Specific Gravity | 1.623 | 1.675 | 1.723 | 1.778 | 1.832 |
| Tensile Strength, psi | 3293 | 2983 | 2990 | 2979 | 2906 |
| Elongation, % | 124 | 107 | 102 | 107 | 98 |
| 50% Modulus, psi | 1334 | 1390 | 1408 | 1362 | 1239 |
| 100% Modulus, psi | 2813 | 2838 | 2967 | 2832 | — |
| Tear Die C, pli | 155 | 169 | 164 | 159 | 145 |
| Physical Properties, Molded 10 min @ 177° C., No post cure | | | | | |
| Hardness, Duro A | 87 | 85 | 90 | 90 | 85 |
| Specific Gravity | 1.614 | 1.658 | 1.708 | 1.759 | 1.819 |
| Tensile Strength, psi | 3028 | 2755 | 2841 | 2730 | 2645 |
| Elongation, % | 156 | 128 | 134 | 116 | 114 |
| 50% Modulus, psi | 586 | 635 | 790 | 850 | 784 |
| 100% Modulus, psi | 1611 | 1882 | 2142 | 2332 | 2220 |
| Tear Die C, pli | 113 | 130 | 115 | 114 | 112 |

Compression Set

Figure 2:
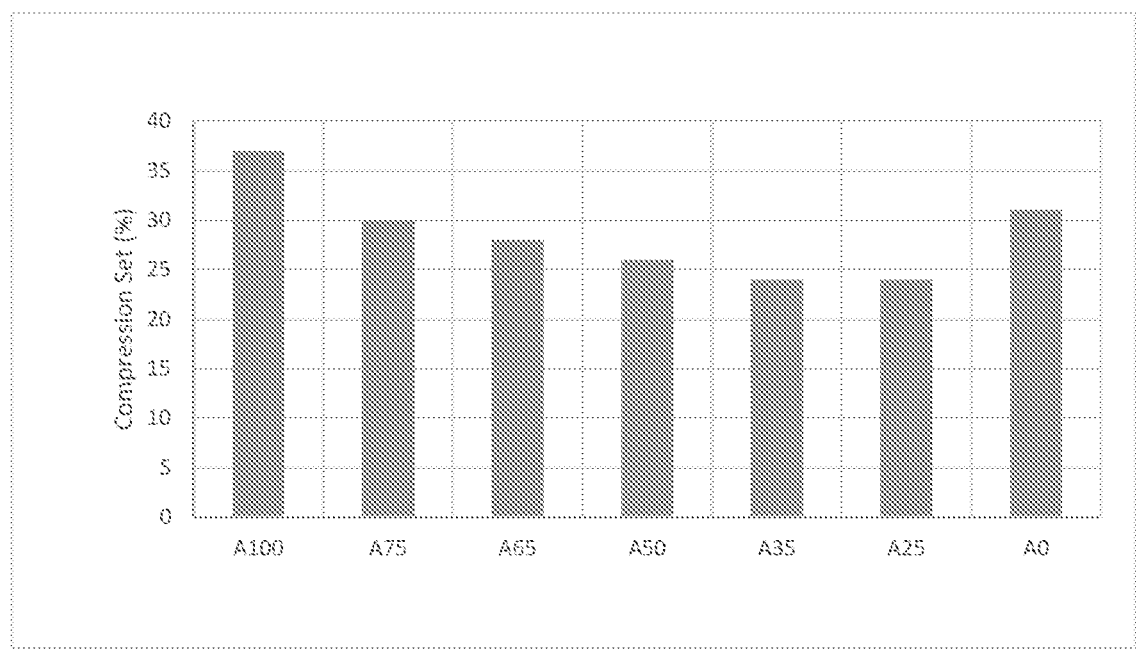
FIG. 2. depicts compression set of the co-cured fluoroelastomers from fluoropolymer A and B.

As show in Table 5A and FIG. 2, the fluoropolymer A (A100) and fluoropolymer B (A0) show the compression set at 37% and 31%, respectively. All other co-cured compounds (A75, A65, A50, A35, A25) show positive synergetic effect and improved compression set with lower values of compression set. The lower value, the better compression set performance. The compression set decreased from 37% for A100 to 24% for A35 and A25 with incorporating fluoropolymer B. The improved compression set and synergetic effect may come from the unique phase structure of the co-cured compounds (two phases structures from the evident of two Tgs (glass transition temperatures).

The newly compounded fluoropolymer A (FEPM with CSM) incorporated with fluoropolymer B (FKM II) processes fast curing with peroxide and better compression set. Compared to fluoropolymer A, the compression set of co-cured fluoroelastomers with incorporated fluoropolymer C decreased from 37% to 18% for AC25 (Table 5B).

TABLE 5A

Compression set co-cured fluoroelastomers from fluoropolymers A and B

| Compound | A100 | A75 | A65 | A50 | A35 | A25 | A0 |
|---|---|---|---|---|---|---|---|
| Compression Set, 70 h 200° C., %* | 37 | 30 | 28 | 26 | 24 | 24 | 31 |

*Compression set measured on buttons molded 45 min @177° C. and post cured 16 hour @ 204° C.

TABLE 5B

Compression set of co-cured fluoroelastomers from fluoropolymers A and C

| Compound | A100 | AC75 | AC50 | AC25 | C |
|---|---|---|---|---|---|
| Compression Set, 70 h 200° C., %* | 37 | 27 | 23 | 18 | 22 |

*Comopression set measured on buttons molded 45 min @ 177° C. and post cured 16 hour @ 204° C.

Thermal Stability

Figure 3:
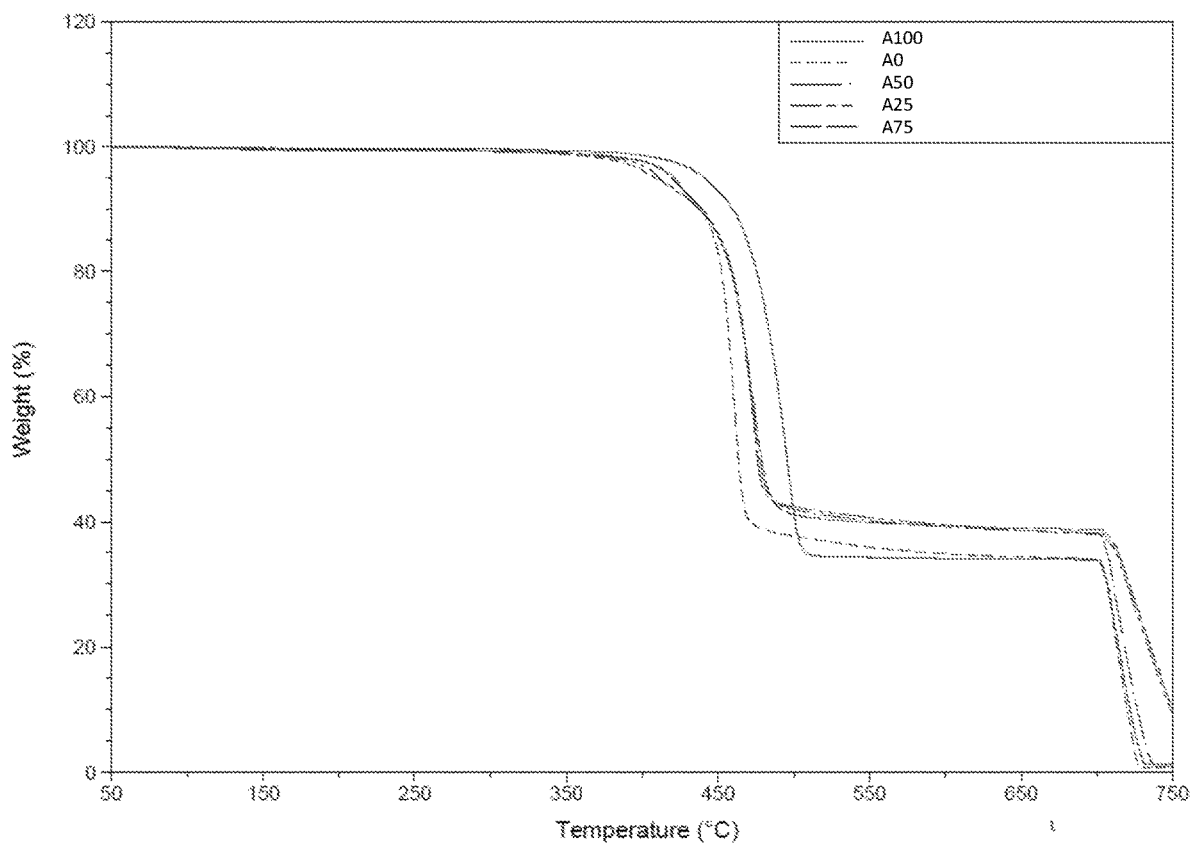
FIG. 3. depicts TGA curves of the co-cured fluoroelastomers from fluoropolymer A and B.

The thermal stability of the fluoroelastomers was studied with TGA. The TGA curves in FIG. 3 shows that the thermal degradation of all fluoroelastomer start above 330° C.

Glass Transition Temperatures of the Fluoroelastomers

Figure 4:
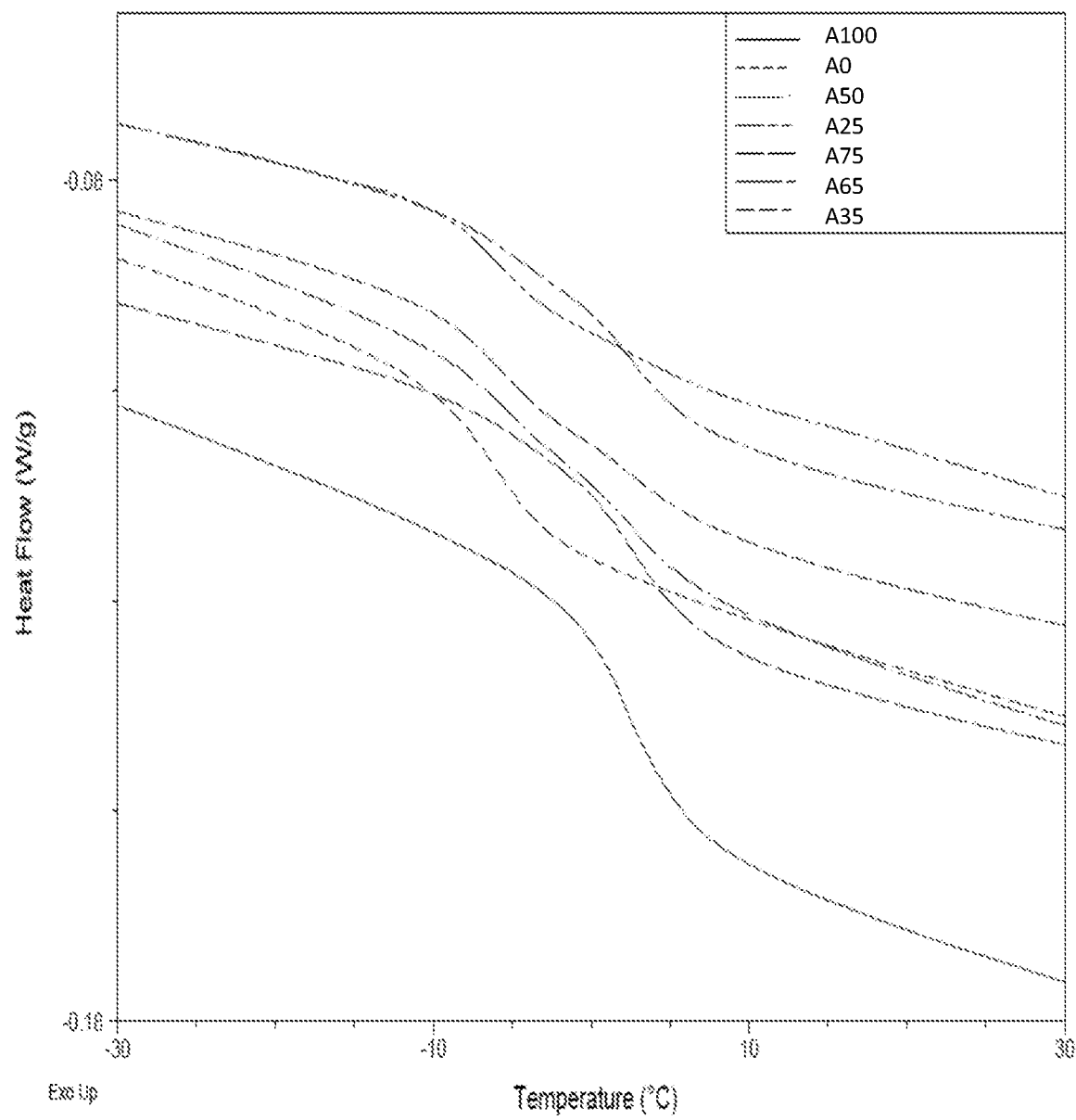
FIG. 4. depicts DSC curves of the co-cured fluoroelastomers from fluoropolymer A and B.

The glass transition temperature of the fluoroelastomers was studied with DSC at scan rate 10° C./min from −60° C. From FIG. 4 and Table 6A, fluoropolymermer A (A100) has Tg at 2.1° C., while the fluoropolymer B (A0) has Tg at −5.9° C. Two clear glass transition temperatures (Tg1 and Tg2) were measured, where the Tg1 is close to the Tg of the fluoropolymer A (A100) and Tg2 is close to the Tg of the fluoropolymer B for the co-cured fluoroelastomers from fluoropolymers A and B (A65, A50, A35). The two glass transition temperatures indicate that the two-phase structures of co-cured fluoroelastomers (A65, A50, A35), where one phase with Tg1 corresponds to the phase of fluoropolymer A, and the phase with Tg2 is corresponds to the phase of fluoropolymer B.

Clearly, the two phase structures of the co-cured compounds contribute heavily to the synergetic effect and improvement in the compression set.

Figure 5:
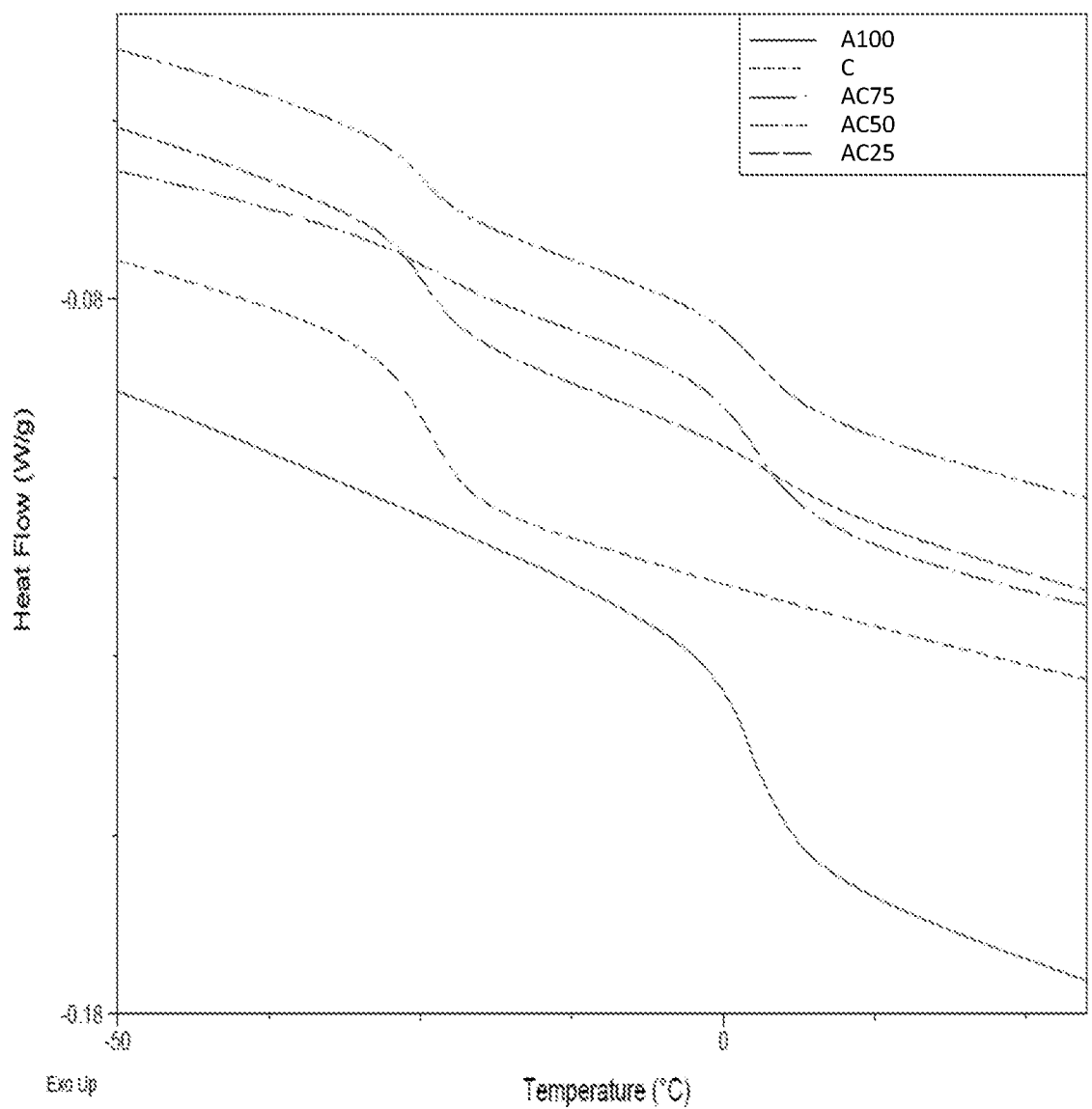
FIG. 5. depicts DSC curves of the co-cured fluoroelastomers from fluoropolymer A and C.

Similarly, FIG. 5 and Table 6B show the glass transition temperatures of co-cured fluoroelastomers from fluoropolymers A and C. The two clear glass transition temperatures (Tg1 and Tg2) measured indicate the two-phase structures of co-cured fluoroelastomers (AC75, AC50, AC25). The lower Tg2 (~−24° C.) of co-cured fluoroelastomers are potentially better for sealing application at lower temperature.

TABLE 6A

Glass transition temperatures of the co-cured fluoroelastomers from fluoropolymers A and B

| Compound | A100 | A75 | A65 | A50 | A35 | A25 | A0 |
|---|---|---|---|---|---|---|---|
| Tg1 (° C.) | 2.1 | 2.7 | 2.6 | 2.4 | 2.8 | — | — |
| Tg2 (° C.) | — | — | −5.3 | −5.3 | −5.5 | −6.0 | −5.9 |

TABLE 6B

Glass transition temperatures of the fluoroelastomers from fluoropolymers A and C

| Compound | A100 | AC75 | AC50 | AC25 | C |
|---|---|---|---|---|---|
| Tg1 (° C.) | 2.1 | 2.7 | 2.7 | 3.8 | — |
| Tg2 (° C.) | — | −24 | −24.8 | −24.9 | −24.3 |

Example 3

Chemical Aging Test:

Simulated production fluid was prepared according to ISO 23936-2 section A.1.ii. Each material was die cut with an ASTM D412 Die C for tensile specimens, and was die cut with an ASTM D624 Die C for tear C specimens. The change in weight was determined according to modified D471 and the Shore A hardness were according to ASTM D471 and Shore A hardness according to ASTM D2240.

The fluid aging conditions are:

The aging fluid composed of (70% heptane, 20% cyclohexane, 10% toluene)/(water) 90%/10% per ISO 23936-2, A.1.ii.

Aging Temperature is 200° C. for a duration of 7 days (166 hours).

The aging was conducted in autoclaves (aging cells).

Tensile specimen size per ASTM D412 Die C. Tear specimen size per ASTM D624 Die C.

The weight swelling is calculated by the percentage of weight increase/original weight of the specimen.

Solvents Aging Test at High Temperature

The solvents aging tests were conducted at 200° C. for 168 hours in the autoclaves per ISO 23936-2, A.1.ii. The solvents (ISO 23936-2, A.1.ii) include (70% heptane, 20% cyclohexane and 10% toluene) 90%/(water) 10%. Tensile test specimens were die-cut per ASTM D412 die C. Tear test specimen were die-cut per ASTM D624 die C.

Figure 6:
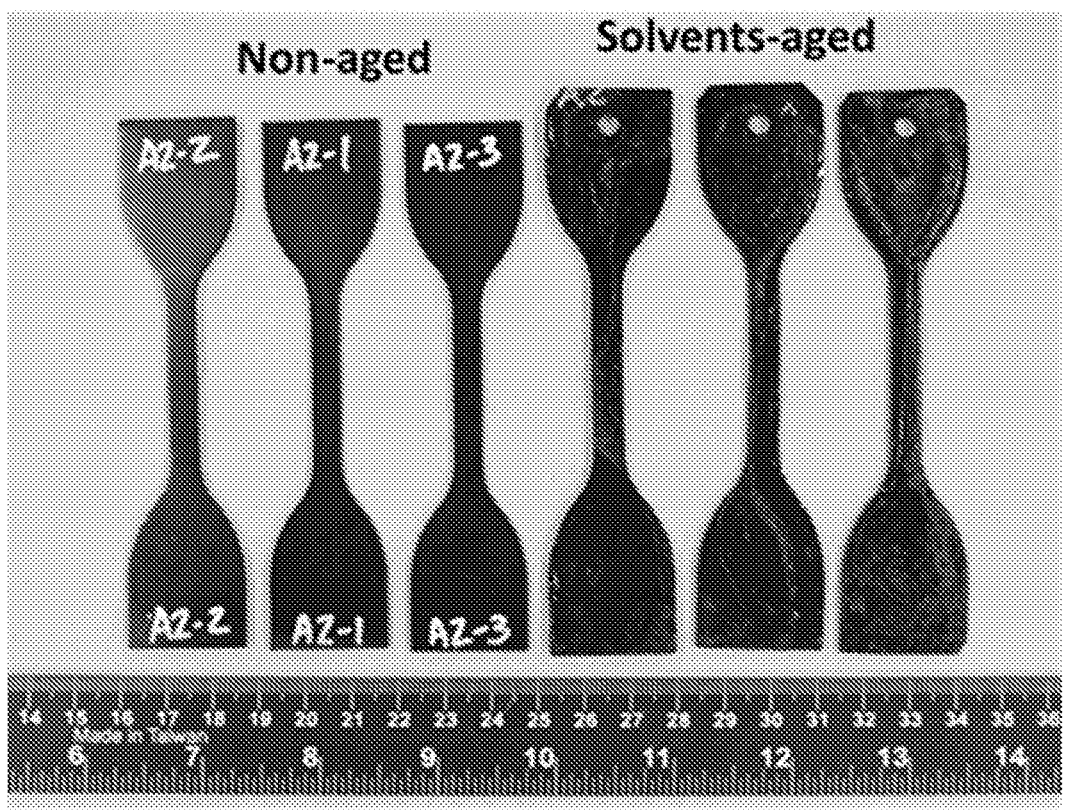
FIG. 6. depicts non-aged tensile bars and solvent aged tensile bars of fluoroelastomer A100.
Figure 7:
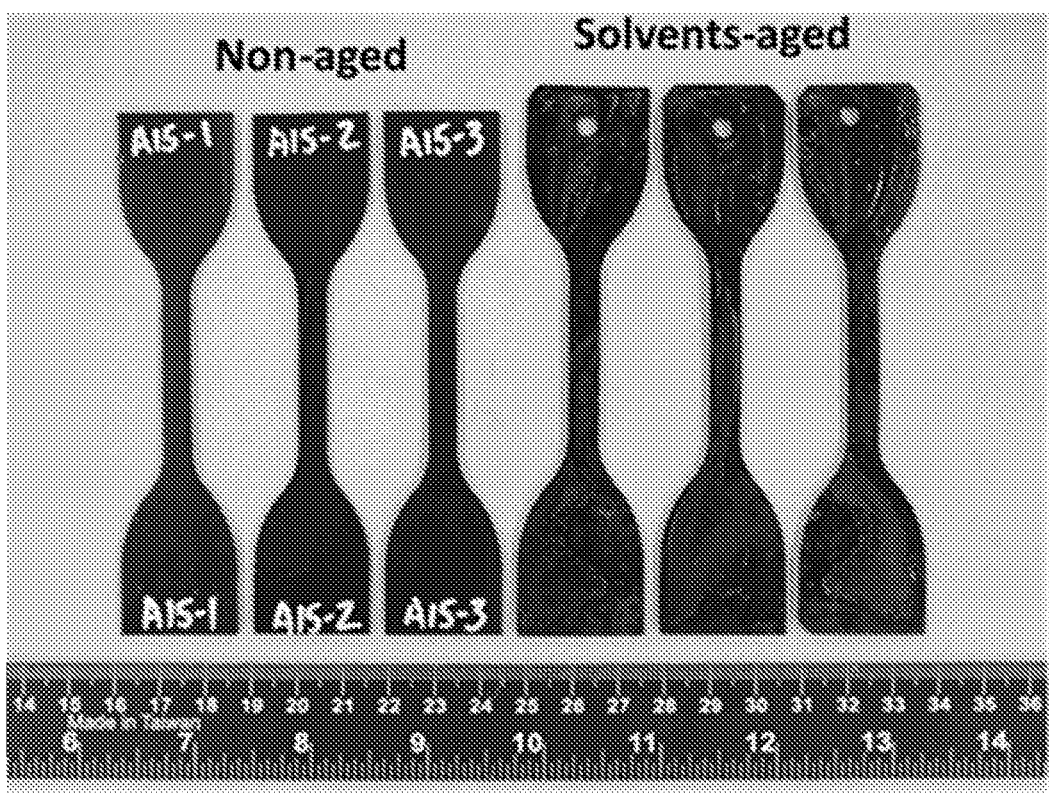
FIG. 7. depicts non-aged tensile bars and solvent aged tensile bars of co-cured fluoroelastomer A50.

FIG. 6 and FIG. 7 show examples of tensile bars of non-aged and solvents aged tensile bars of A100 and A50 compounds.

The weight swelling results of co-cured fluoroelastomers from fluoropolymers A and B are summarized in Table 7A. The addition of fluoropolymer B (FKM II) into the system reduces weight swelling from 25% for pure fluoropolymer A (A100) (FEPM) to ~15% for compound A35 with 35% fluoropolymer B (FKM II) addition. This indicates that better solvent resistance can be achieved through forming co-cured fluoroelastomers, compared to pure fluoropolymer A (A100) (FEPM).

Figure 8:
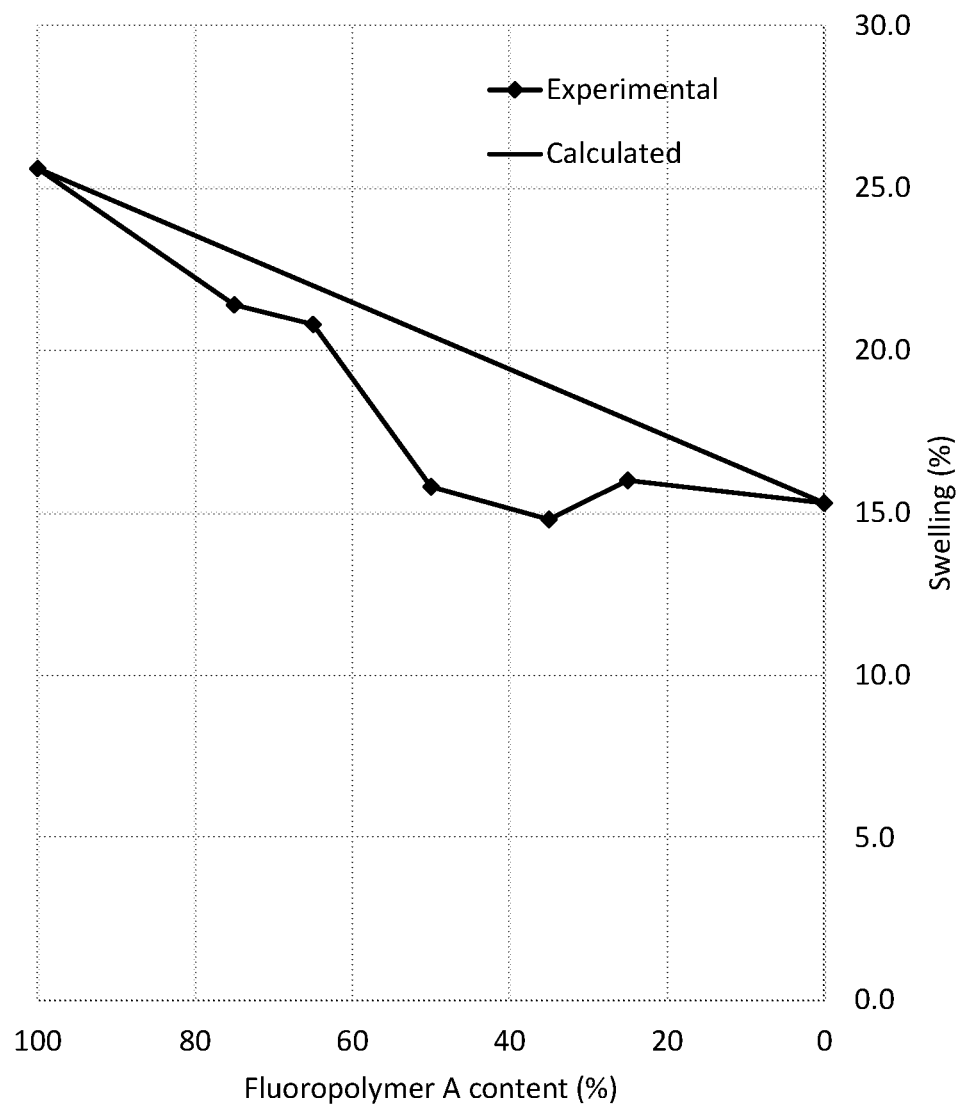
FIG. 8. depicts experimental and calculated swelling percentage of co-cured fluoroelastomers from fluoropolymers A and B.

FIG. 8 shows the experimental swelling data and calculated swelling data for the co-cured compounds. The experimental swell data results of the co-cured compounds are lower than the calculated swelling data based the contents of fluoropolymer A and fluoropolymer B. Similarly, this positive synergistic effect was observed in the compression set result as well. This positive synergetic effect mainly due to the two-phase structure of the co-cured compounds. The swelling of A0 (fluoropolymer B) is much lower (40% lower) than the A100 (fluoropolymer A). When formed compounds A50 containing 50% of fluoropolymer B, the compound has more bi-continual phases from fluoropolymer A and fluoropolymer B, the fluoropolymer B phase provides more constrain for the swelling, so the swelling is closer to A0 (fluoropolymer B). Similarly, fluoropolymer B formed major phase in the compounds A35 and A25, thus, the swelling is more constrained by the phase of fluoropolymer B, and are very close to A0 (fluoropolymer B).

Table 8A shows changes of Shore A duro hardness of the co-cured fluoroelastomers after solvents aging. After solvent aging, the hardness reduced for each compound. The changing (decreasing) value becomes smaller for the co-cured flouroelastomers from fluoropolymers A and B with increasing fluoropolymer B content from −40 for pure fluoropolymer A (A100) to −30 for A25.

Similarly, from Table 8B, the changing (decreasing) value becomes smaller for the co-cured flouroelastomers from fluoropolymers A and C with increasing fluoropolymer C content from −40 for pure fluoropolymer A (A100) to −30 for AC25.

TABLE 7A

Swelling percentage of co-cured fluoroelastomers from fluorpolymers A and B) after 168-hour aging at 200° C. with hydrocarbon solvents (ISO 23936 A.1.ii).

| Compound | A100 | A75 | A65 | A50 | A35 | A25 | A0 |
|---|---|---|---|---|---|---|---|
| Swelling (%) (by weight) | 25.6 | 21.4 | 20.8 | 15.8 | 14.8 | 16.0 | 15.3 |
| Swelling (%) (by calculation) | 25.6 | 23.0 | 22.0 | 20.5 | 18.9 | 17.9 | 15.3 |

TABLE 7B

Swelling percentage of co-cured fluoroelastomers (from fluoropolymers A and C) after 168-hour aging at 200° C. with hydrocarbon solvents (ISO 23936 A.1.ii).

| Compound | A100 | AC75 | AC50 | AC25 | C |
|---|---|---|---|---|---|
| Swelling (%) (by weight) | 25.6 | 18.3 | 18.6 | 15.7 | 16.9 |
| Swelling (%) (by calculation) | 25.6 | 23.4 | 21.3 | 19.1 | 16.9 |

TABLE 8A

Changes of Shore A hardness of co-cured fluoroelastomers (from fluoropolymers A and B) after 168-hour aging at 200° C. with hydrocarbon solvents (ISO 23936 A.1.ii).

| Compound | A100 | A75 | A65 | A50 | A35 | A25 | A0 |
|---|---|---|---|---|---|---|---|
| Change in Shore A Hardness | −40 | −38 | −34 | −34 | −31 | −30 | −24 |

TABLE 8B

Changes of Shore A hardness of co-cured fluoroelastomers (from fluoropolymers A and C) after 168-hour aging at 200° C. with hydrocarbon solvents (ISO 23936 A.1.ii).

| Compound | A100 | AC75 | AC50 | AC25 | C |
|---|---|---|---|---|---|
| Change in Shore A Hardness | −40 | −35 | −35 | −30 | −25 |

TABLE 9A

Tensile strength retention of co-cured fluoroelastomers (from fluorpolymers A and B) after swelling after 168-hour aging at 200° C. with hydrocarbon solvents (ISO 23936 A.1.ii).

| Compound | A100 | A75 | A65 | A50 | A35 | A25 | A0 |
|---|---|---|---|---|---|---|---|
| Tensile Strength retention (%) | 46.0 | 38.9 | 49.1 | 59.8 | 67.8 | 57.8 | 52.3 |

TABLE 9B

Tensile strength retention of co-cured fluoroelastomers (from fluoropolymer A and fluoropolymer C) after swelling after 168-hour aging at 200° C. with hydrocarbon solvents (ISO 23936 A.1.ii).

| Compound | A100 | AC75 | AC50 | AC25 | C |
|---|---|---|---|---|---|
| Tensile Strength retention (%) | 46.0 | 59.1 | 55.6 | 73.2 | 64.1 |

The tensile properties of the solvent aged samples was measured according to ASTM D412C, and compared with no-aged samples to generate the retention of the tensile strength (%). Table 9A shows the tensile strength retention of the co-cured fluoroelastomers from fluoropolymers A and B. The results indicate that the tensile strength retentions of compounds A50 59.8%, A35 (67.8%), A25 (57.8%) are higher than both fluoropolymer A (A100, 46%) and fluoropolymer B (A0, 52.3%) as well. So increased tensile strength retention indicates that forming co-cured fluoroelastomers improved the solvent-aging resistance of the fluoroelastomers and demonstrates a positive synergetic effect.

Table 9B also shows the tensile strength retention increases of the co-cured fluoroelastomers with incorporating fluoropolymer C from fluoropolymer A, indicating improved solvents-aging resistance.

The tear strength of the solvent aged samples was measured according to ASTM D624C, and compared with non-aged samples to generate the retention of the tear strength (%). Table 10A indicates that the tear strength retention of co-cured fluoroelastmers A75 (48.1%), A65 (52.3%), A50 (53.8%), A35 (58.6%), A25 (50.9%) increases) from both fluoropolymer A (A100) (47.8%) and fluoropolymer B (A0) (43.0%). Thus, increased tear strength retention indicates that forming co-cured fluoroelastomers improves the solvent-aging resistance of the fluoroelastomers and demonstrates positive synergetic effect.

Similarly, from Table 10B the tear strength retention of co-cured fluoroelastomers (AC75, AC50, AC25) from fluoropolymers A and C is higher than the ones of fluoropolymer A and fluoropolymer C. Therefore, increased tear strength retention indicates that forming co-cured fluoroelastomers improves the solvent-aging resistance of the fluoroelastomers and show positive synergetic effect.

Figure 9:
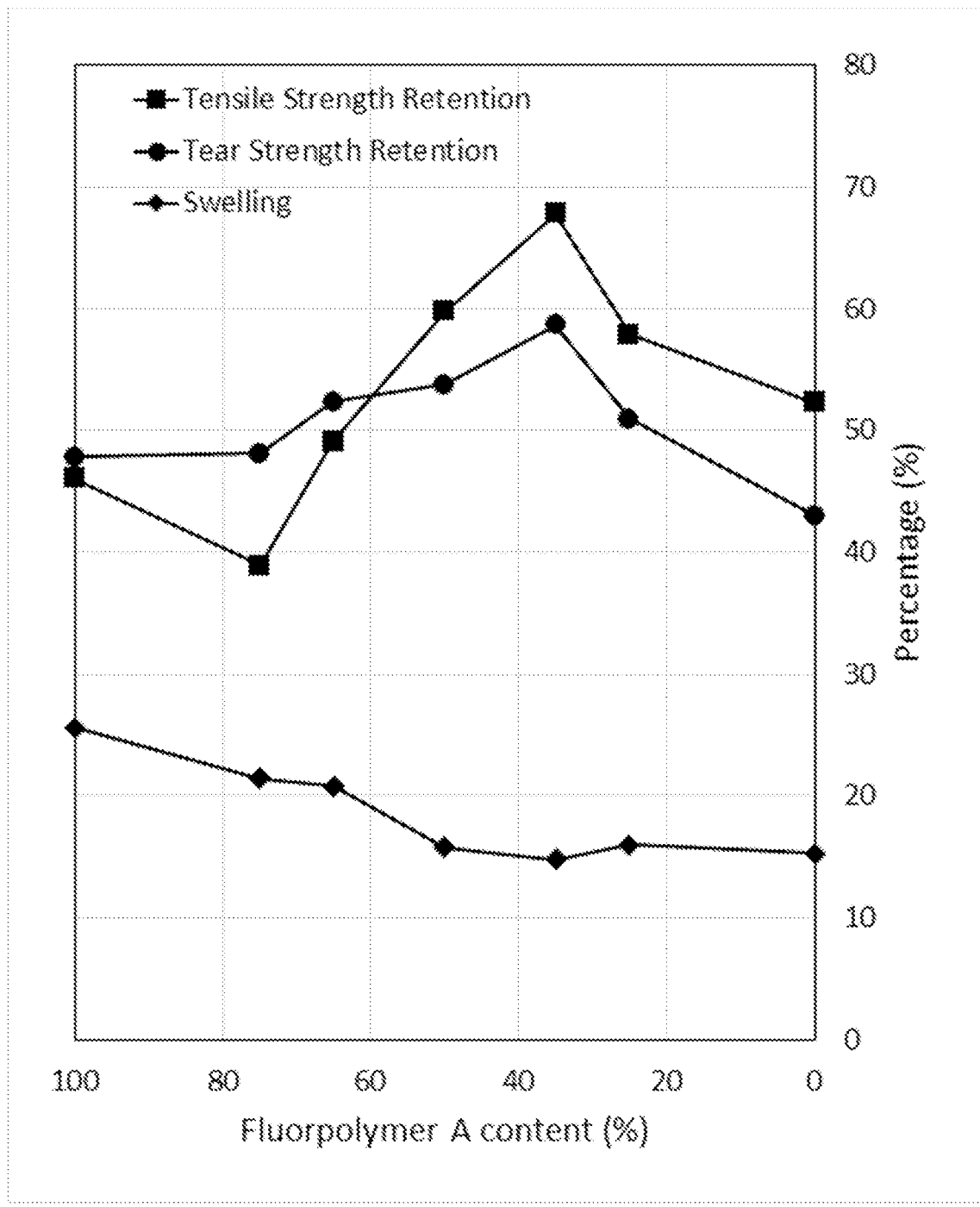
FIG. 9. depicts tensile strength retention, tear strength retention and swelling percentage of co-cured fluoroelastomers from fluoropolymer A and B after 168-hour aging at 200° C. with hydrocarbon solvents (ISO 23936 A.1.ii).

The data summarized in Table 11 and FIG. 9 demonstrates the effect of solvent-aging on the swelling, tensile strength retention, and tear strength retention with co-cured fluoroelastomers. The positive synergetic effects are demonstrated by the reduction of swelling and increased retention of tensile strength via forming co-cured fluoroelastomers.

TABLE 10A

Tear strength retention of co-cured fluoroelastomers from fluoropolymers A and B after 168-hour aging at 200° C. with hydrocarbon solvents (ISO 23936 A.1.ii).

| Compound | A100 | A75 | A65 | A50 | A35 | A25 | A0 |
|---|---|---|---|---|---|---|---|
| Tear Strength retention (%) | 47.8 | 48.1 | 52.3 | 53.8 | 58.6 | 50.9 | 43.0 |

TABLE 10B

Tear strength retention of co-cured fluoroelastomers from fluoropolymers A and fluoropolymer C after 168-hour aging at 200° C. with hydrocarbon solvents (ISO 23936 A.1.ii).

| Compound | A100 | AC75 | AC50 | AC25 | C |
|---|---|---|---|---|---|
| Tear Strength retention (%) | 47.8 | 54.6 | 57.0 | 51.9 | 51.0 |

TABLE 11

Summary of the swelling percentages, tensile strength retention, tear strength retention of co-cured fluoroelastomers (from fluorpolymers A and B) after 168-hour aging at 200° C. with hydrocarbon solvents (ISO 23936 A.1.ii).

| Compound | A100 | A75 | A65 | A50 | A35 | A25 | A0 |
|---|---|---|---|---|---|---|---|
| Tensile Strength retention (%) | 46.0 | 38.9 | 49.1 | 59.8 | 67.8 | 57.8 | 52.3 |
| Tear Strength retention (%) | 47.8 | 48.1 | 52.3 | 53.8 | 58.6 | 50.9 | 43.0 |
| Swelling (%) (by weight) | 25.6 | 21.4 | 20.8 | 15.8 | 14.8 | 16.0 | 15.3 |

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A co-cured elastomeric blend comprising:
about 25-75 parts fluoropolymer A;
about 25-75 parts fluoropolymer C,
carbon black at about 45 parts per 100 parts of polymers;
a peroxide initiator, and
a triazine co-crosslinking agent, wherein:
fluoropolymer A comprises a polymer of tetrafluoroethylene (TFE), propylene (PP), and cure site monomer (CSM), wherein the fluoropolymer A comprises about 35-55% propylene (PP), wherein the fluoropolymer A has a fluorine content about 57 wt %;
fluoropolymer C comprises a polymer of vinylidene fluoride (VDF), tetrafluoroethylene (TFE), and a perfluorinated methyl vinyl ether (PMVE), wherein the fluoropolymer C has a fluorine content about 70 wt %; and
fluoropolymer A and fluoropolymer C are crosslinked with the peroxide initiator, and the triazine co-crosslinking agent, wherein the co-cured elastomeric blend exhibits a synergistic effect and improvement in compression set, having a reduced compression set of about 18% when using a composition of 25 wt % fluoropolymer A of the reaction product from a compression set about 37% when using 100% fluoropolymer A, swelling percentage of co-cured fluoroelastomers from 50 parts fluoropolymer A and 50 parts fluoropolymer C after 168-hour aging at 200° C. with hydrocarbon solvents is 18.6% as compared to calculated 21.3%.

2. The blend of claim 1, wherein the peroxide initiator is 2,5-dimethyl-2,5-di(t-butylperoxy)hexane (DBPH).

3. The blend of claim 2, wherein the peroxide initiator 2,5-dimethyl-2,5-di(t-butylperoxy)hexane (DBPH) is present at 1 to 5 parts per 100 parts of polymers.

4. The blend of claim 1, wherein the peroxide initiator is di(t-butylperoxyisopropyl)benzene.

5. The blend of claim 4, wherein the peroxide initiator di(t-butylperoxyisopropyl)benzene is present at about 1 to 5 parts per 100 parts of polymers.

6. The blend of claim 1, wherein the triazine cross linking agent is triallyl isocyanurade (TAIC).

7. The blend of claim 6, wherein TAIC is present at about 1 to 7 parts per 100 parts of polymers.

8. The blend of claim 1, wherein the CSM is selected from the group consisting of iodine atom and bromine atom.

9. A co-cured elastomeric blend comprising about 25-75 parts fluoropolymer A fluoropolymer C wherein:
and about 25-75 parts fluoropolymer A comprises a polymer of tetrafluoroethylene (TFE), propylene (PP), and cure site monomer (CSM), wherein the fluoropolymer A comprises about 35-55% propylene (PP), wherein the fluoropolymer A has a fluorine content about 57 wt %;
fluoropolymer C comprises at least one monomer unit of a perfluorinated methyl vinyl ether (PMVE)), wherein the fluoropolymer C has a fluorine content about 70 wt %; and
carbon black at about 45 parts per 100 parts of polymers;
wherein fluoropolymer A and fluoropolymer C are crosslinked with a peroxide initiator, and a triazine co-crosslinking agent, wherein the co-cured elastomeric blend exhibits a synergistic effect and improvement in compression set, having a reduced compression set of about 18% when using a composition of 25 wt % fluoropolymer A of the co-cured elastomeric blend from a compression set about 37% when using 100% fluoropolymer A, swelling percentage of co-cured fluoroelastomers from 50 parts fluoropolymer A and 50 parts fluoropolymer C after 168-hour aging at 200° C. with hydrocarbon solvents is 18.6% as compared to calculated 21.3%.

10. The blend of claim 9, wherein the CSM is selected from the group consisting of iodine atom and bromine atom.

11. The blend of claim 9, wherein the peroxide initiator comprises di(t-butylperoxyisopropyl)benzene and di(t-butylperoxyisopropyl)benzene is present at about 1 to 5 parts per 100 parts of polymer.

12. The blend of claim 9, wherein the CSM comprises an iodine atom.

13. A co-cured elastomeric blend comprising about 25-75 parts fluoropolymer A and about 25-75 parts fluoropolymer C wherein:
fluoropolymer A comprises monomer units and cure site monomer (CSM), wherein the fluoropolymer A comprises about 35-55% propylene (PP), wherein the fluoropolymer A has a fluorine content about 57 wt %;
fluoropolymer C comprises at least one monomer unit of a perfluorinated methyl vinyl ether (PMVE)), wherein the fluoropolymer C has a fluorine content about 70 wt %; and
carbon black at about 45 parts per 100 parts of polymers;
wherein fluoropolymer A and fluoropolymer C are crosslinked with a peroxide initiator, and a triazine co-crosslinking agent, wherein the co-cured elastomeric blend exhibits a synergistic effect and improvement in compression set, having a reduced compression set of about 18% when using a composition of 25 wt % fluoropolymer A of the co-cured elastomeric blend from a compression set about 37% when using 100% fluoropolymer A, swelling percentage of co-cured fluoroelastomers from 50 parts fluoropolymer A and 50 parts fluoropolymer C after 168-hour aging at 200° C. with hydrocarbon solvents is 18.6% as compared to calculated 21.3%.

14. The blend of claim 13, wherein the CSM is selected from the group consisting of iodine atom and bromine atom.

* * * * *